United States Patent [19]

Takemura et al.

[11] Patent Number: 5,239,595
[45] Date of Patent: Aug. 24, 1993

[54] OPTICAL METHOD FOR IDENTIFYING OR RECOGNIZING A PATTERN TO BE IDENTIFIED

[75] Inventors: Yasuhiro Takemura, Shiroi; Toshiharu Takesue, Chiba, both of Japan

[73] Assignee: Sumitomo Cement Company Ltd., Japan

[21] Appl. No.: 616,248

[22] Filed: Nov. 20, 1990

[30] Foreign Application Priority Data

Nov. 20, 1989 [JP] Japan .................... 1-299538

[51] Int. Cl.$^5$ .............................................. G06K 9/76
[52] U.S. Cl. ........................................ 382/31; 382/43; 359/561
[58] Field of Search ............... 382/31, 42, 32, 43; 350/162.13, 3.68, 3.67, 3.82

[56] References Cited

U.S. PATENT DOCUMENTS 4,573,198  2/1986  Anderson ............................ 382/31
5,029,220  7/1991  Juday ............................. 350/162.13

OTHER PUBLICATIONS

A Real-Time Programmable Joint Transform Correlator; pp. 10-16, "Optics Communications"; Nov. 1, 1984; vol. 52, No. 1.
A Technique for Optically Convolving Two Functions; C. S. Weaver et al.; "Applied Optics"; pp. 1248-1249; vol. 5, No. 7; Jul. 1966.
Detection of Differences in Real Distributions; pp. 1490-1494; "Journal of the Optical Society of America"; James E. Rau; Nov., 1966.
Synthetic Discriminant Function-Based Binary Nonlinear Optical Correlator; "Applied Optics"; Bahram Javidi; vol. 28, No. 13; Jul. 1, 1989.
Joint Transform Correlator Limitations; "SPIE"; Don A. Gregory et al.; pp. 198-207; vol. 1053; 1989.
Illumination Dependence of the Joint Transform Correlation; "Applied Optics"; vol. 28, pp. 3288-3290; Aug. 15, 1989.

*Primary Examiner*—Michael T. Razavi
*Assistant Examiner*—Yon Jung
*Attorney, Agent, or Firm*—Hoffman, Wasson & Gitler

[57] ABSTRACT

A method of obtaining a correlation between a pattern to be identified and a number of reference patterns by irradiating and displaying the pattern to be identified and the reference patterns on an optical display plane, thereby producing a complex optical amplitude distribution. This distribution is Fourier-transformed to produce a first power spectrum corresponding to the light intensity distribution of its Fourier transformation patterns. The patterns are again irradiated based upon the first power spectrum and a second Fourier transform is performed to produce a second power spectrum which is the light intensity distribution of the second Fourier transformation pattern. The area of this distribution is restricted by controlling the transmittance or the reflectance of each of the portions of the display plane.

6 Claims, 6 Drawing Sheets

OPTICAL METHOD FOR IDENTIFYING OR RECOGNIZING A PATTERN TO BE IDENTIFIED

BACKGROUND OF THE INVENTION

1. Field of the Invention

The present invention relates to an optical method and apparatus for identifying or recognizing a pattern to be identified, by obtaining the correlation of images or patterns to be utilized in the field of optical data processing, and particularly relates to improved optical method and apparatus of recognizing a pattern or image to be identified, by presenting the correlation between a pattern to be identified and each of reference patterns.

2. Description of the Prior Art

There has been proposed a method of obtaining correlation between a pattern to be identified and each reference pattern of a group of reference patterns by displaying the pattern to be identified and the reference patterns on the same plane, and irradiating a coherent beam on such a plane to produce a first power spectrum of optical complex amplitude distribution to produce a first power spectrum image on another plane. Subsequent, irradiating coherent radiation to the resulting image based on the first power spectrum to produce a second power spectrum by optical way would thereby produce an optical output corresponding to the correlation between the pattern to be detected and the reference pattern.

The proposed method is useful in point of view of enabling optical processing in pseudo-real time even by using a spatial light-modulator with a relatively low resolution, and further, would improve an identifying ability when a plurality of reference images are presented by positive feed-back processing of correlation output between the pattern to be identified and each of the reference patterns.

Figure 1:
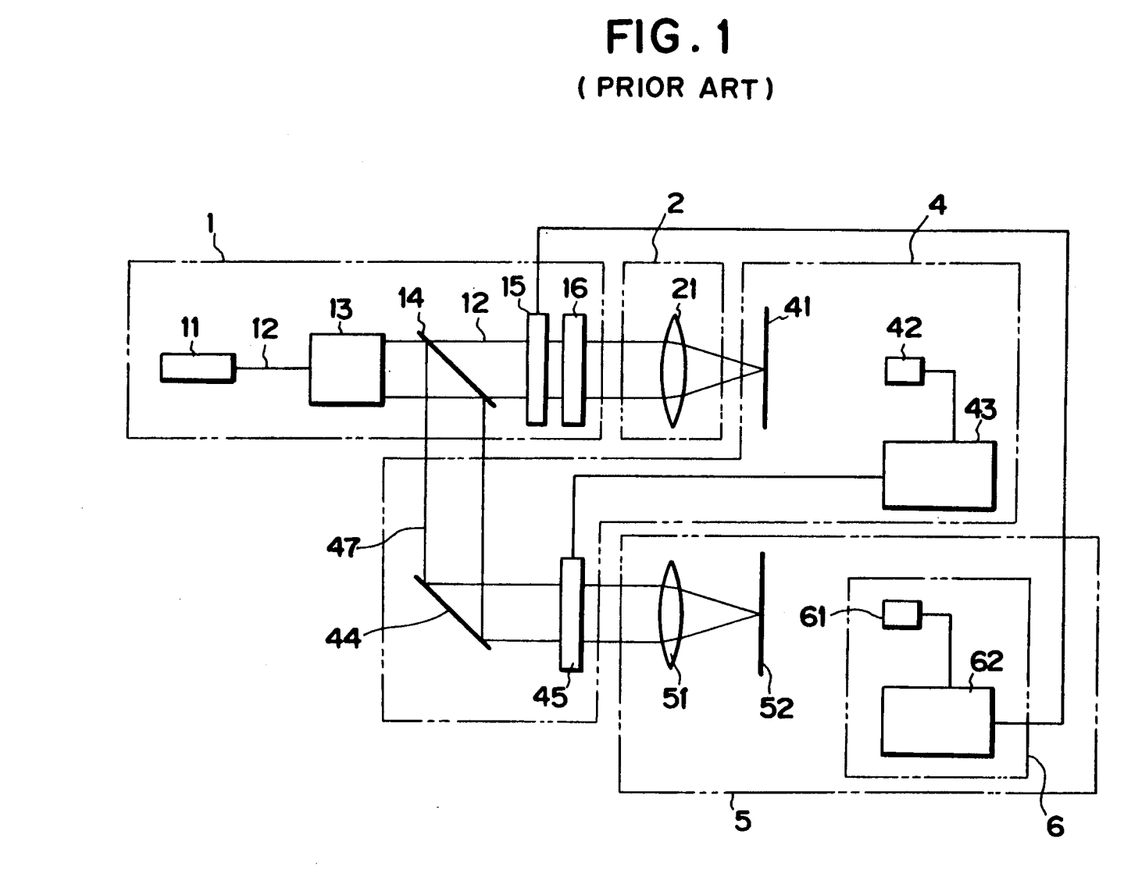
FIG. 1 shows generally a prior art optical apparatus for producing correlation between a pattern to be identified and each of a series of reference patterns in a group, and identifying the pattern to be identified.

FIG. 1 shows a prior art construction of an apparatus for obtaining correlation between a pattern to be identified and reference patterns of a group. This apparatus comprises a display 1 for displaying an input pattern; a first Fourier transformation means 2 for Fourier-transforming the input pattern displayed on the input display 1; a display 4 for presenting again the resulting first power spectrum obtained by the first Fourier transformation; a detector for detecting a second power spectrum obtained by a second Fourier transformation, and a feed back processor for modulating the intensity of the beam to irradiate the reference patterns formed on the input display plane 16 in accordance with the resulting correlation with the reference pattern.

The coherent beam 12 emitted from a coherent source 11 such as He-Ne laser is expanded by a beam expander 13, and passes through a beam splitter 14 and a first spatial light modulator 15 and irradiates an input display 16, in which the first spatial light-modulator 15 is a liquid crystal panel with arranged matrix electrode cells. The display 16 presents a pattern to be identified and reference patterns on the same liquid crystal panel, or alternatively a pattern to be identified is presented on a liquid crystal panel and reference patterns are presented on the same plane as that of the liquid crystal panel by a photographic film on which the reference patterns are recorded.

The input pattern is projected through a Fourier-transformation lens 21 to Fourier-transform spatially, thereby presenting the joint Fourier transformation pattern (power spectrum) on a screen 41. This pattern is imaged on a CCD camera 42, in which the pattern formed in accordance with the intensity of the output of the CCD camera 42 is fed through a processing and liquid crystal device circuit 43 into a liquid crystal panel 45 in the similar way. The pattern formed on the liquid crystal panel 45 corresponds to a power spectrum of the input pattern, which is irradiated by a beam 47 which has been formed by the reflection of the beam 12 at a beam splitter 14, and then, the pattern is Fourier transformed by a lens 51 to form a Fourier transformed pattern (power spectrum) on a screen 52. The resulting pattern formed on the screen 52 is a distribution of the intensity according to each correlation with each of the patterns, at the positions, corresponding to the positions of each of the input patterns, by centering to the optical axis thereof.

The distribution thereof is detected by a CCD camera 61, and then, the distribution of the transmittance of the spatial light-modulator 15 is modulated in accordance with the detected correlation by a processing and device circuit 62, so as to control the light-intensity distribution of the incident beam to each of the reference patterns formed on the display 16. In other words, the reference pattern with high correlation to the pattern to be identified is more strongly irradiated, and in contrast, the reference pattern with low correlation is more weakly irradiated, so that the loop processing in such fed-back will produce more accurate correlation and identification.

However, in such method of producing the correlation between the pattern to be identified and each of the reference patterns, when the number of the reference patterns is large, the additional output of the correlation between the reference patterns is presented in addition to the output of the correlation between the pattern to be identified and each of the reference patterns, such additional output will disturb the detection of the output of the correlation between the pattern to be identified and each of the reference patterns, and further, the first power spectrum obtained by the first Fourier transformation would contain more unnecessary information, so that the output of the correlation between the pattern to be identified and each of the reference patterns would contain more noise, or the S/N ratio would be lowered. Further, when the pattern to be identified is not exactly the same as the reference pattern, the interference pattern generated by the power spectrum of the reference patterns which would be presented at the position where the irradiation amount of the power spectrum of the pattern to be identified is substantially small and then, would interfere with correct recognition.

SUMMARY OF THE INVENTION

Accordingly, an object of the present invention is an improved method for obtaining correlation between a pattern to be recognized and each pattern of a group reference patterns, wherein correct and accurate correlation can be detected even when the number of the reference patterns to be reviewed is large.

It is another object of the present invention to provide an optical method of recognizing a pattern with less mis-recognition by restraining or neglecting a portion of output which does not contribute to the essential output of the correlation, to produce correction and accurate correlation of the pattern to be identified and each of the reference patterns.

It is still another object of the present invention to provide an optical identifier enabling correct and accurate correlation between the pattern to be detected and each reference pattern of the reference group.

BRIEF DESCRIPTION OF THE DRAWINGS

The objects and features of the present invention will become more apparent from the consideration of the following detailed description taken in conjunction with the accompanying drawings in which.

DETAILED DESCRIPTION OF PREFERRED EMBODIMENTS

In accordance with the present invention, an optical method and apparatus for obtaining each correlation between a pattern to be identified and each of the reference patterns, comprises the steps of (a) irradiating coherent radiation on a pattern to be identified and each of reference patterns to be compared with, so as to display (or give) simultaneously coherent patterns having light complex amplitude distribution, consisting at least of a pattern to be identified, and each of the reference patterns on a first optical display plane, thereby producing an optical complex amplitude distribution respectively corresponding to the pattern to be identified and each of the reference patterns;

(b) Fourier-transforming optically said optical complex amplitude distribution, so as to produce a first power spectrum corresponding to the light intensity distribution of its Fourier transformation patterns of optical complex amplitude distribution;

(c) irradiating coherent radiation again to the pattern based on the first power spectrum, so as to produce a complex amplitude distribution corresponding to the first power spectrum;

(d) Fourier-transforming optically the complex amplitude distribution to produce a second power spectrum which is the light intensity distribution of a Fourier-transformation pattern corresponding to an output of correlation formed between the pattern to be identified and each of the reference patterns; wherein the area of the complex amplitude distribution for the Fourier transformation to produce the second power spectrum is restricted according to a two dimensional Fourier-transformation pattern of the pattern to be identified, by controlling the transmitance or the reflectance of each of the portions of the display plane.

In this optical method for identifying a pattern to be identified, only the pattern to be identified is irradiated by a coherent radiation, and then, a complex amplitude distribution only due to the pattern to be identified is optically Fourier-transformed in a spatial frequency coordinates which have almost the same scale as the coordinates of the first power spectrum, so as to produce a third power spectrum; and the resulting third power spectrum and the first power spectrum are superimposed, and the range in the first power spectrum contributing to the light intensity distribution of the second spectrum is restricted to the area having the light intensity of the third spectrum over the certain threshold value of the light intensity.

Each output emitted from each of the reference patterns by irradiation of the coherent beam to the display plane for the reference patterns may preferably be modulated in its complex amplitude distribution in accordance with each optical output by each of the correlations with the pattern to be identified. Further, the means for modulating or restricting the areas of the patterns may comprise a first two dimensional image sensor for receiving a third power spectrum, a electrically processing apparatus of binarizing the received power spectrum, and feeding the binarized information into a spatial light-modulator positioned near to the plane of the first power spectrum. The first power spectrum can be fed into the second two-dimensional image sensor, and the third power spectrum can be fed into the first two dimensional image sensor, and then, the means for restricting the areas will binarize the output from the first two dimensional image sensor, and calculate the multiplication of the resulting received pattern with the output pattern from the second two-dimensional image sensor to obtain the product of the two patterns, and then, the resulting product can be optically Fourier-transformed as a first power spectrum, so as to feed into a second spatial light modulator for obtaining the second power spectrum. Further, the means for restricting the area in the display may comprise preferably a second optical addressing type spatial light modulator.

Further, the means for restricting the area in the plane may comprise the second addressing type spatial light modulator for, receiving and modulating the third power spectrum and the threshold to the input beam intensity wherein the reflectance or transmittance of the area corresponding to the portion of the pattern having the value more than the threshold value is higher than that of the other area in the display. The pattern of that display is imaged onto the first two dimensional image sensor providing the electrical information, and then, the processor calculates to multiply the electric information (the output pattern from the first image sensor) with the output pattern from the second image sensor so as to result in the product of the two patterns. The resulting product pattern is used as a first power spectrum to be Fourier-transformed optically into a second power spectrum.

The essential portion of the present invention resides in that the pattern to be identified and each of the reference patterns can be presented on the same first plane, and are Fourier-transformed to form first power spectrums having the light intensity distributions (i.e. the first pattern), and such pattern(s) is presented on another display under the similar spatial frequency coordination system on the first plane, and the pattern presented on the second display, based on the first power spectrums is irradiated again by a coherent beam so as to emit the beam having the optical distribution, and the emitted beam i.e. the complex distribution of the output beam is Fourier transformed by passing through a Fourier-transformation lens so as to obtain the second power spectrum having the light intensity distribution. The areas or portions of the first power spectrum which can contribute to the formation of the second power spectrum having the Fourier-transformed light intensity distribution are restricted to the areas or the portions in the third power spectrum which have the intensity higher than a certain threshold value.

When the pattern to be identified is the same as one of the reference patterns, each pattern of the power spectrums is the same, and is presented at the same position. Each of the complex amplitudes of the power spectrums has delayed phase or shifted phase to each other. Therefore, the pattern formed on the plane of the first power spectrum has interference fringes whose grating constants are corresponding to the respective distance between the two patterns, along with the respective direction of each pattern. Accordingly, the necessary information is only the data presented on the pattern of the power spectrum of the pattern to be identified. The other information presented out of this pattern is unnecessary, and then the information presented and formed by the relation between the respective reference patterns is this kind of information and is unnecessary. Therefore, the third power spectrum formed only by the pattern to be identified or tested is presented in the spatial frequency coordinate similar to that in the first power spectrum, and then, the areas or portions in the first power spectrum to contribute the formation of the second power spectrum is restricted and controlled into the areas or portions of the third power spectrum having the light intensity higher than a certain threshold value of the light intensity.

The output from the second Fourier transformation means which output corresponds to the correlation coefficient is fed back to the first output means to control the irradiation intensity against each of the reference patterns at the first output means, therefore, the influence of the reference patterns having low correlation coefficient is selectively removed, so that correct and rapid selection or choice of area can be exerted to a number of the reference patterns.

In accordance with the present invention, spatial patterns corresponding to the reference patterns and an pattern to be identified can be formed and displayed on a first pattern output means, and can be Fourier-transformed by a first optical Fourier transformation means so as to produce multiple interference fringes formed by interference between the reference patterns and the pattern to be identified.

Figures 2, 3:
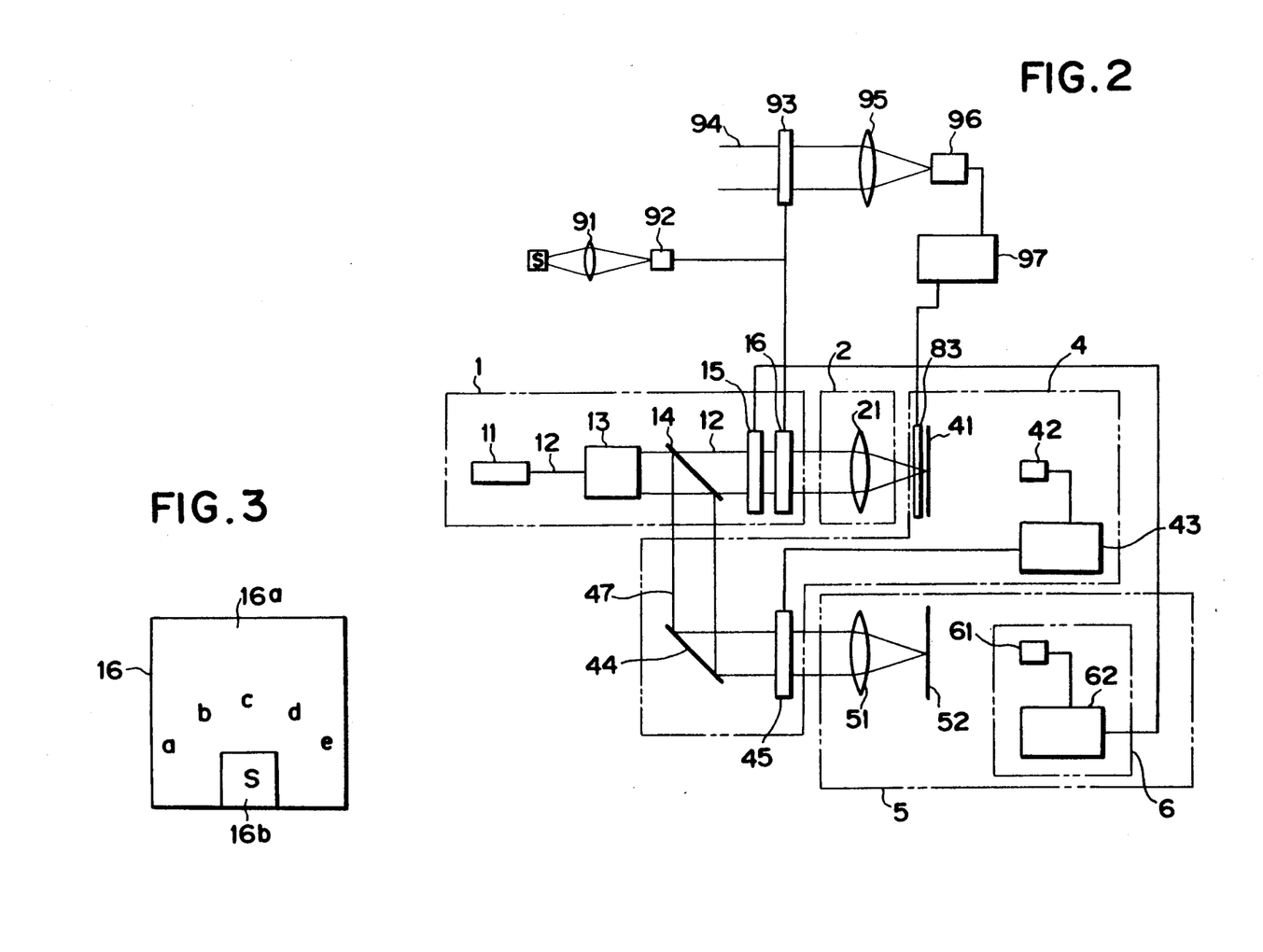
FIG. 2 shows schematically the construction of the inventive optical apparatus for presenting the correlation between the pattern to be identified and each one of the reference patterns, and identifying a pattern to be identified.
FIG. 3 shows a schematic illustration showing a display representing a pattern to be identified and each reference pattern of the group of reference patterns or input patterns to be identified in the inventive optical identifier.

The coherent beam having the intensity distribution or phase distribution corresponding to the intensity distribution of the multiple interference fringe as formed, emits or radiates from the second pattern output means (i.e. 45 of FIG. 2).

The complex amplitude distribution pattern of this coherent beam (i.e. 47 of FIG. 2) is Fourier transformed by the second optical Fourier transformation means to produce the two-dimensional intensity distribution representing the correlation, the relative positions of the reference patterns and the pattern to be identified, and further the correlation between the reference pattern and the pattern to be identified.

This two-dimensional intensity distribution is transferred into the first pattern output means (i.e. 15 of FIG. 2), and the intensity of the output from the first pattern output means is such that the portions for the reference patterns having the high correlation intensity is highly irradiated, and the portions having the lower correlation intensity has lower irradiation.

While the above operation is repeated, the amount of the radiation emitting from the portions for the reference pattern having relatively low correlation will be gradually lowered, and the reference patterns having the shape resembling that of the pattern to be identified will remain so as to decrease the number of the reference patterns to be compared, i.e. the candidates. As the number of the candidates is decreased, the visibility of the interference fringes formed by the first Fourier transformation means will be raised so as to enable correct comparison or association of the pattern to be identifies with the remaining reference patterns.

However, when the pattern to be identified is a partly lacking of one of the reference patterns, i.e. incomplete one of one of the reference patterns, the intensity of the radiation emitting from this one of the reference patterns will be low in the initial stage of the processing operation, but because this one has the higher correlation intensity when the intensity of the radiation emitting from this one is lower than the initial stage, the intensity of the radiation emitting from this reference pattern will be gradually raised during the repeated operations.

In view of the foregoing, while the processing operations are repeated in accordance with the present invention, the output of the correlation with regard to the reference pattern will be gradually increased even if the initial output is low. On the other hand, the output from the other reference patterns which shall have low correlation with the pattern to be identified will be gradually lowered, and then, the number of the reference patterns remaining to be compared with the pattern to be identified will be constrained into one or several.

Such operation can facilitate rapid and correct calculation of the correlation with the patterns to be tested.

In accordance with the optical apparatus, the first pattern output means (i.e. 1 of FIG. 2) is essentially consisting at least of, (1) a coherent light source (i.e. 11 of FIG. 2), (2) a first spatial light modulator (i.e. 15 of FIG. 2) for modulating a spatial distribution patten of complex amplitude of the beam emitted from the source, (3) one or more display units (i.e. 16 of FIG. 2) for displaying reference patterns and patterns identified by the input beam emitted from the spatial light modulator.

Further, the first spatial light modulator (i.e. crystal liquid light valve 15 of FIG. 2) has a number of fractions in its display, each of the fractions receives a portion of the output beam (i.e. intensity pattern formed on the screen 52 of FIG. 2), each of which is respectively corresponding to each portion of the beam from the second optical Fourier transformation means (i.e. lens 51 of FIG. 2), and each fraction changes its transmittance or reflectance in line with the intensity of the output beam.

When the first spatial light modulator is of an optical addressing type, the beam is directed directly to the first spatial light modulator. When the modulator is of an electric addressing type, the beam is received by the first two-dimensional image sensor (i.e. two-dimensional image sensor 61, e.g. C.C.D.) and the produced signal will be transferred through the image processor and spatial light modulator driving circuit (i.e. 62 of FIG. 2) into the first modulator (i.e. the valve 15 of FIG. 2).

The display units (i.e. the portions of the display 16 of FIG. 2) for displaying said reference pattern group comprises a spatial light modulator, i.e. 16a of FIG. 3, to be addressed electrically for modulation.

The display units (i.e. the other portions of the display 16' of FIG. 1) for displaying said pattern to be identified comprises an incoherent to coherent converter (16a of FIG. 3).

The second pattern output means (i.e. 4 of FIG. 2) comprises at least, (1) a coherent radiation source (i.e. 11 of FIG. 2) and (2) a fourth spatial light modulator (i.e. 45 of FIG. 2) for modulating a complex amplitude distribution of the beam passing through or reflecting on it, on the basis of the signal from the second two-dimensional image sensor (i.e. 42 of FIG. 1) receiving the output beam from the first Fourier transformation means (i.e. 21 of FIG. 2) to give the output of the modulated complex amplitude distribution.

The second pattern output means (i.e. 4 of FIG. 5) may comprise at least, a coherent light source (i.e. 11 of FIG. 2), and a third spatial light modulator (i.e. 45 of FIG. 5) of changing its optical characteristics, in a two-dimensional or three-dimensional form, on the basis of the intensity distribution of the output beam received from the first Fourier transformation means.

The present invention is further illustrated by the following examples to show an optical method for identifying a pattern to be identified by producing and comparing each of the correlations between a pattern to be identified and each of reference patterns, but should not be interpreted for the limitation of the invention.

EXAMPLE 1

FIG. 2 shows schematically one preferred embodiment of the inventive optical method or apparatus for identifying a pattern by producing each correlation between a pattern to be identified and each of the reference patterns, in an optical arrangement view.

In the optical arrangement view of FIG. 2, a coherent beam 12 emitting from a source 11 such as a semiconductor laser or a gas laser is expanded by a beam expander 13 into a beam having an appropriate diameter, and is divided by a beam splitter 14 into the two beams 12 and 47. The beam 12 passes through a matrix liquid crystal panel 15, and enters into a display apparatus 16.

The display apparatus 16 has a reference patten display portions 16a to display reference patterns, and a portion 16b to display a pattern to be identified, as shown in FIG. 3. For example, a pattern "s" to be tested is irradiated by a coherent beam or incoherent beam, and then is focused by a lens 91 to form an image on a surface of a CCD 92. The pattern to be identified is presented in a portion 16b to display a pattern to be tested, and on a matrix liquid crystal panel 93.

A beam 12 passing through a display apparatus 16 will pass further through a lens 21 and then, the power spectrum of its input pattern incidences upon a screen 41. On the other hand, the matrix liquid crystal panel 93 is irradiated by a light beam 94 having the same wavelength as that of the beam 12, and then the beam 94 passes through a Fourier transformation lens 95 having the same focal length as that of the Fourier transformation lens 21, and then, the power spectrum of the pattern "s" to be tested incidences upon a CCD 96. The detected pattern based on such power spectrum is binarized positively with a processing and a liquid crystal driving apparatus 97, and then the resulting pattern is presented on a matrix liquid crystal panel 83.

This matrix liquid crystal panel 83 is positioned near to the screen 41 which is corresponding to the spectrum plane of the input image display apparatus 16, and the range to receive the power spectrum by a CCD camera 42 is restricted. The received pattern is indicated on a matrix liquid crystal panel 45, and then the following process is similar to that of the prior art.

The liquid crystal panel 83 can be placed at the neighborhood of the matrix liquid crystal panel 45 instead of being placed near the screen 41.

While this liquid crystal spatial light modulator (SLM) 15 has naturally a uniform transmittance districution, the transmittance of the area corresponding to the portions of the SLM 15 for the reference pattern having the high correlation to the power spectrum of the pattern to be identified will be increased, and the transmittance of the area having the low correlation will be decreased as a result of the below mentioned processing way.

A pattern display apparatus 16 has two components, i.e. a display portion 16b of FIG. 3, for a pattern to be identified and a display portion 16a for the reference patterns. The display portion 16a for the reference pattern functions as a spatial light modulator recording the multiple reference patterns in a photographic film, or to display the multiple reference patterns by an electrical input or an optical input. The display portion 16b for the pattern to be identified functions as a spatial light modulator so as to enable an electric or optical input of the pattern to be identified.

As shown in FIG. 3, for example, the reference patterns as indicated by "a", "b", "c", "d" and "e" are displayed in the display portion 16a, and the pattern "s" to be tested is displayed in the display portion 16b.

The beam 12 passing through the pattern display apparatus 16 passes further through the Fourier transformation lens 21 and incidences upon a screen 41 provided at the plane of the Fourier transformation. On this screen 41, the light intensity proportional to the square of the two-dimensional Fourier transformation of the complex amplitude distribution is observed. The light intensity distribution formed on the surface of the screen 41 can be detected by a two-dimensional image sensor 42 using an element such as a charge coupled device (CCD), in which the portions unnecessary to identify the outline of the pattern are removed or reduced by limiting a field of the two-dimensional photoelectric transducer.

The pattern produced at the surface of the CCD camera 42 is transferred as electric signals through a video amplifier and a liquid crystal light valve driving circuit 43 to the display plane of the liquid crystal light valve 45, to display therein. This liquid crystal light valve 45 functions as a spatial light modulator in a similar way to that of the valve 15, modulating the light intensity or the complex amplitude of the received beam to emit the modulated beam. The beam 47 passing through the liquid crystal light valve 45 is one of the before mentioned two beams into which the beam 12 is divided by a beam splitter 14, and therefore, the source for this modulator is common to the source for the pattern output means 4.

The beam 47 coming out from the liquid crystal light valve 45 passes through a Fourier transformation lens 51 and incidences (gives a focus) on a screen 52. The screen 52 is positioned at the Fourier plane with regard to the liquid crystal light valve 45, and then, the intensity of the light at the screen 52 will stand for (describes) the extent of the spatial cross-correlation between the pattern to be identified and each of the reference patterns.

Therefore, in order to avoid overlapping the cross-correlation of the reference patterns each to the other, the patterns should be arranged to be formed on the display plane of the pattern display apparatus, and then the patterns arranged and formed on the plane can be detected so as to determine the position and the corresponding correlation of the reference pattern having the strong correlation with the pattern to be identified, by forming them on the surface of the CCD plane of the camera 61.

In FIG. 3, the pattern display apparatus 16 describes (or pictures), for example, the reference patterns "a", "b", "c", "d" and "e" in the reference pattern group, and the pattern "s" to be identified.

The pattern to be identified as shown in FIG. 3 can be recognized to be a partly short one of the pattern selected from the group of the reference patterns.

The auto-correlation of each pattern can be presented on the optical axis of the beam, and the cross-correlations between the reference patterns and the pattern to be identified appear in a pair of patterns at the positions which are symmetric to each other with respect to the optical axis, having a distance from the center of the beam corresponding to the correlative position between the reference pattern and the pattern to be identified.

Accordingly, the peak of the cross-correlation between the pattern to be identified and each of the reference patterns will appear at the position on the plane of the screen 52, which position corresponds to the position of each of the reference patterns formed on the plane of the pattern display apparatus 16.

However, when the number of the reference patterns is large, it will be impossible to read definitely the correlation peak of the reference pattern group to the pattern to be identified.

Accordingly, in this embodiment the light intensity to irradiate each of the reference patterns is changed by reading out the light intensity formed on the screen 52, and feeding the resulting electric signals to the pattern processing and valve driving circuit 62, to regulate into the cross-correlations to each of the reference patterns, and then determining the distribution of the transmittance on the liquid crystal light valve 15. For example, if the reference pattern having the highest correlation to the pattern to be identified is the pattern "b", the transmittance of the portion of the plane in the liquid crystal light valve 15 through which the pattern "b" passes is maximized.

To the other reference patterns, for example, the intensity of the irradiation to the pattern "a" will be controlled in accordance with the transmittance of the plane portion of the liquid crystal light valve through which the beam to irradiate the reference pattern "a" passes.

EXAMPLE 2

Figure 4:
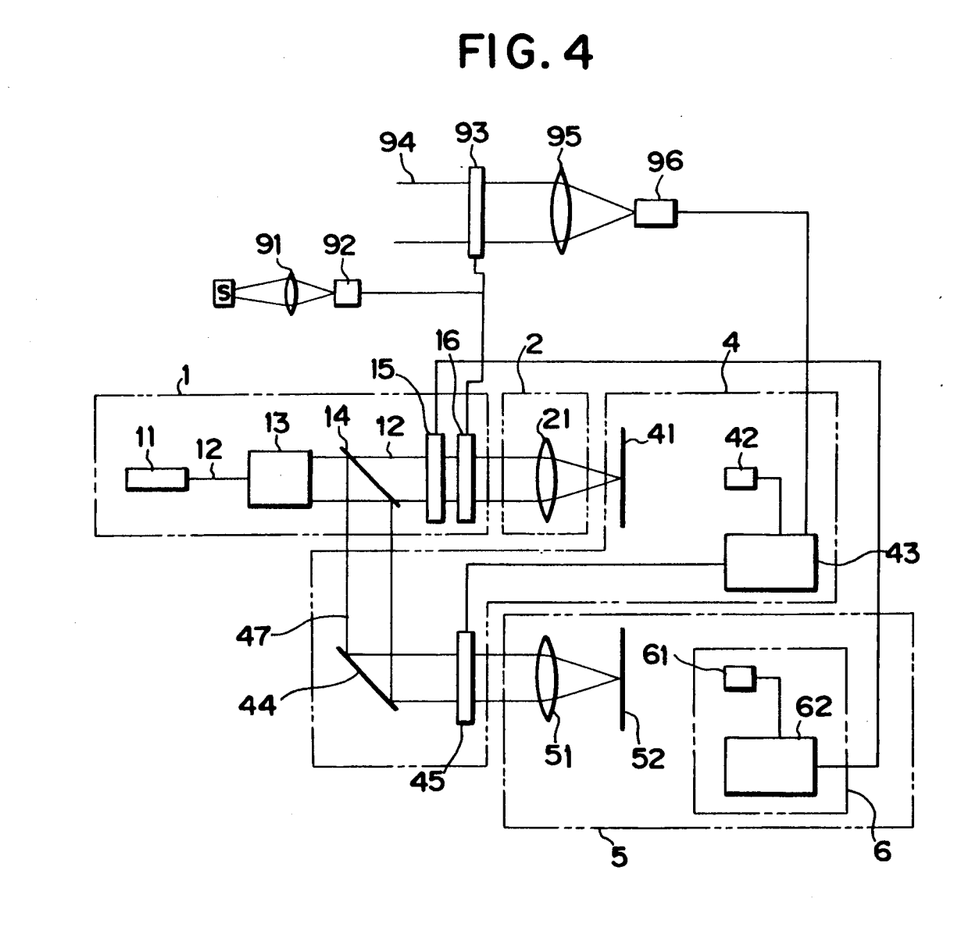
FIGS. 4 to 7 show schematically the composition of the inventive optical apparatus for producing correlation between a pattern to be tested and reference patterns, and identifying a pattern to be identified.

FIG. 4 illustrates another preferred embodiment of the inventive optical apparatus for identifying a pattern to be identified by producing the correlation between a pattern to be identified and each of the reference patterns.

The exception from the apparatus of FIG. 2 is that the matrix liquid crystal panel 83 is not used to restrict the range in which the beam transmits through, and the output from the CCD 96 is binarized, and the binarized pattern and the output from the CCD camera 42 are multiplied to generate the product of the two outputs, and the power spectrum pattern restricted into the range of restriction is displayed on a matrix liquid crystal panel 45.

The apparatus of FIG. 4 is substantially similar to that of FIG. 2 except of the above-mentioned.

The display apparatus 16 has a reference pattern display portions 16a and a portion 16b to display the pattern to be identified, as shown in FIG. 3.

A pattern "s" to be tested is irradiated by a coherent beam, and then is focused by a lens 91 to form a pattern on a surface of a CCD 92. The output from the CCD camera 92 based on the pattern "s" is fed into a valve 15 so as to display the pattern "s" in a portion 16b and further, on a matrix liquid crystal panel 93. A beam 12 passing through a display apparatus 16 will pass further through a lens 21 and then, the power spectrum of its input pattern is presented on a screen 41.

On the other hand, the matrix liquid crystal panel 93 is irradiated by a light beam 94 having the same wavelength as that of the beam 12, and then the beam 94 passes through a Fourier transformation lens 95 having the same focal length as that of the Fourier transformation lens 21, and then, the power spectrum of the pattern to be tested enters into a CCD 96.

The pattern of such power spectrum is binarized positively with a processing and a liquid crystal driving apparatus 43, and multiplied with the pattern detected by CCD 42, and then the resulting pattern is indicated on a matrix liquid crystal panel 45. This matrix liquid crystal panel 45 is irradiated by the beam 47 and the power spectrum formed on the panel 45 is projected through a Fourier lens 51 onto the screen 52. Such Fourier transformed power spectrum is detected by a CCD camera 61, and is indicated on a matrix liquid crystal panel 15, and then the following process is similar to that of the prior art.

EXAMPLE 3

Figure 5:
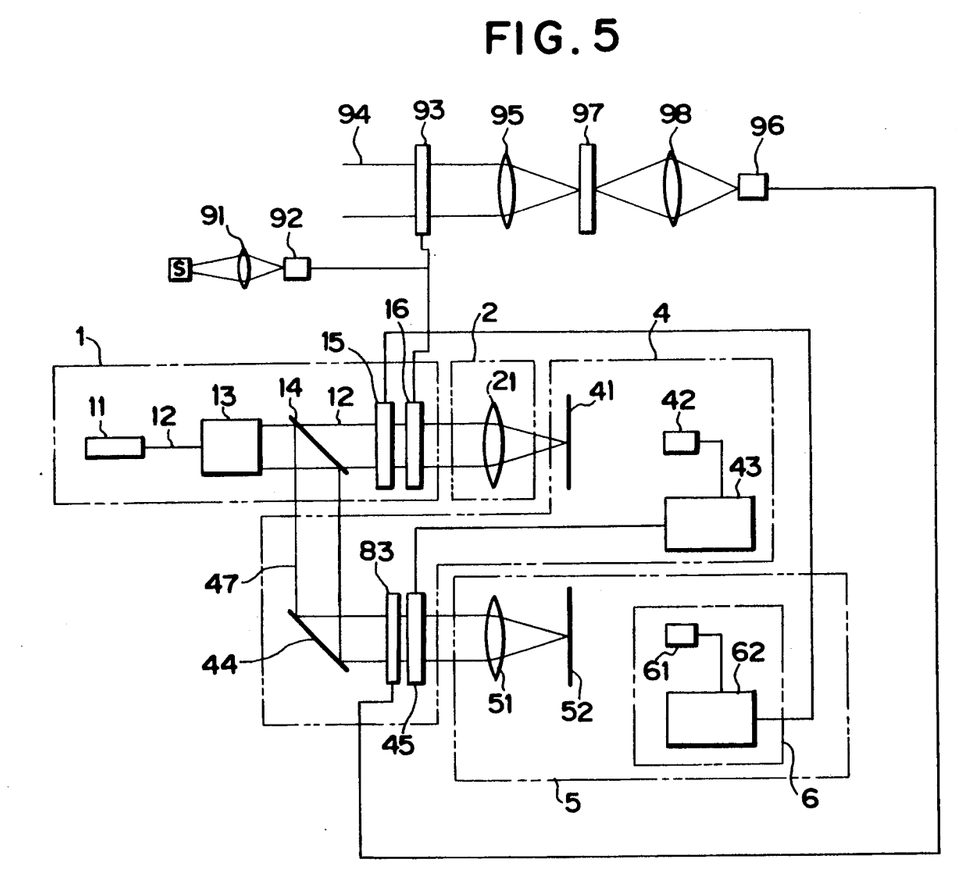

FIG. 5 illustrates further another preferred embodiment of the inventive optical apparatus for identifying a pattern to be identified by producing the correlation between pattern to be identified and each of the reference patterns.

The exception from the apparatus of FIG. 2 is the process for binarizing of the power spectrum of the pattern to be identified, wherein the pattern to be tested indicated on the matrix liquid crystal panel 93 is irradiated and spatially Fourier-transformed by a Fourier transformation lens 95, and to the resulting light distribution is incident upon a light addressable liquid crystal light valve 97.

The light addressable liquid crystal light valve 97 has the structure in which each of the ferroelectric liquid crystal cells of the panel is attached to each of the photo-conductive layer cells, and bias electric field is applied on, and thereby the voltage proportional to the intensity of irradiation will be applied to the liquid crystal layer cell which is irradiated by a beam, and then, only the liquid crystal cell receiving higher intensity than a certain threshold value is changed in its molecular orientation, so as to change the polarization state of the incident beam, thereby raising the reflective rate of the beam. Therefore, the output pattern produced on the valve 97 is irradiated by a coherent or incoherent beam so as to form a power spectrum pattern on the CCD 96 by imaging the output pattern of the valve 97 on the CCD 96 through a lens 98. The formed pattern is to be used as a mask pattern to be fed into a liquid crystal panel 83. The position at which the liquid crystal panel 83 is located may be at the neighborhood of the panel 45 or the screen 41 as mentioned in Example 1 and FIG. 1.

In the apparatus of FIG. 5, the beam 12 passing through the beam splitter 14 enters into the pattern display apparatus 16, and passes through Fourier transformation lens 21, and forms the intensity distribution pattern of the joint Fourier-transformed pattern of the reference patterns and the pattern to be identified. The pattern "s" to be identified is projected through a lens 91 into a a CCD camera 92, and the resulting information obtained by the CCD camera 92 is fed into a display 16, and at the same time is fed into a matrix liquid crystal panel 93.

The pattern formed on the panel 93 is irradiated by a beam, and the resulting information by such irradiation is Fourier-transformed through a Fourier transformation lens 95, and incident upon the ferroelectric liquid crystal light valve 97. the Fourier transformed pattern is binarized by the ferroelectric liquid crystal valve 97 and imaged on a CCD 96 through a lens 98 and the binarized pattern is fed to the matrix liquid crystal panel 83.

The resulting pattern (data) having the intensity distribution (power spectrum) produced in the processor 43 is fed into the display 45 and is displayed in the display plane, and the formed pattern in the plane is irradiated by the beam 47. Then, the irradiating beam to be applied to the liquid crystal light valve 45 is a beam 47 passing through the beam splitter 14. The beam 47 is reflected by a mirror 44 and incident on the screen 52.

EXAMPLE 4

Figure 6:
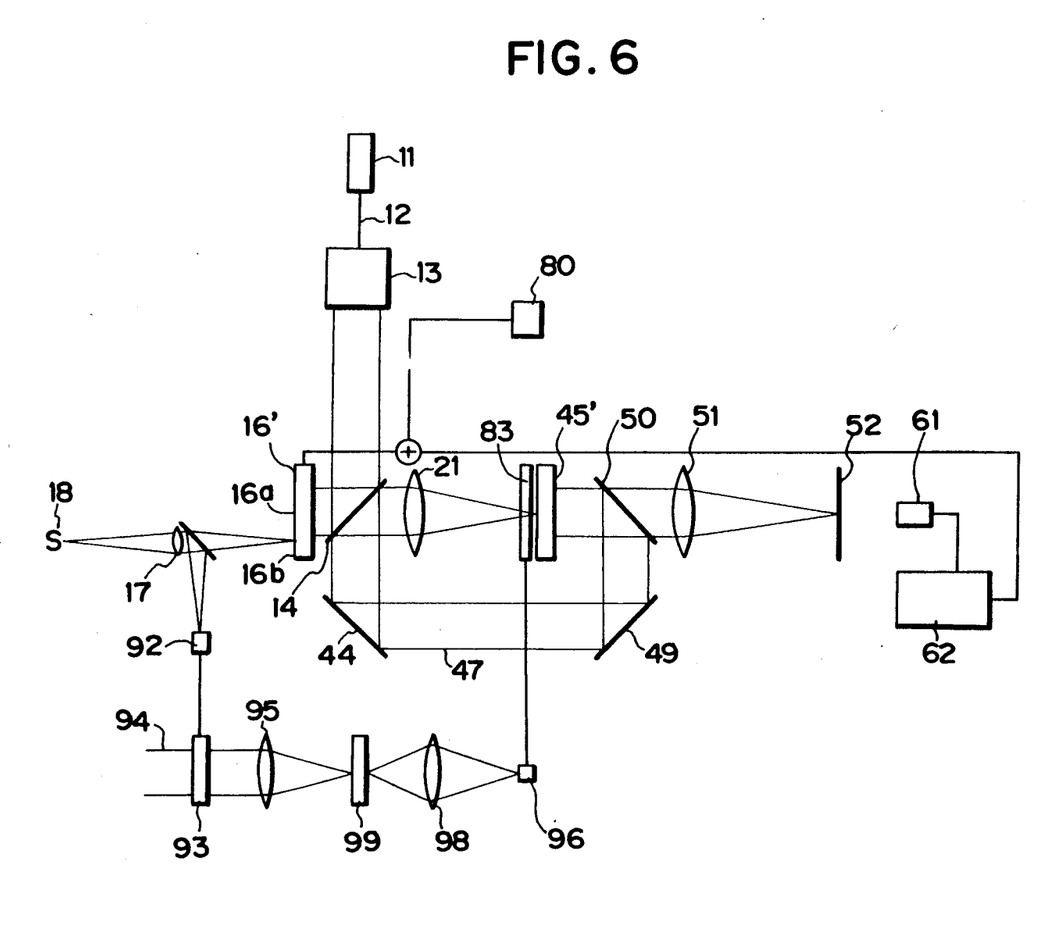

FIG. 6 shows another optical apparatus for obtaining the correlation between a pattern to be identified and each of the reference patterns in which a double Fourier-transforming optical system is used without any electrical serial processing.

The exception of this apparatus from the apparatus of Example 3, FIG. 3 is the use of an optical addressing type liquid crystal light valve 45' in place of a CCD camera 42, a processing and liquid crystal driving circuit 43 and a matrix liquid crystal panel 45.

The distribution of reflectance in the read-out plane of the valve 45' is presented which is corresponding to the pattern formed on the write-in plane of the valve 45, and the output pattern resulted by the irradiation of the beam 47 to the read-out plane of the valve 45' can be operated and processed in the same way as that in the apparatus of FIG. 5.

The valve used is a light addressing liquid crystal light valve which can have the previously mentioned ferroelectric liquid crystal panel with photoconductive layer, and the product available in the market using an ordinary nematic liquid crystal material can be used.

The beam 12 emitting from a laser source 11 is reflected by a half mirror 14 and enters into an pattern display apparatus 16'. The pattern display apparatus 16' is essentially consisting of an incoherent to coherent converter, each portions of which is corresponding to each of the display portions for the pattern to be identified, and a spatial matrix modulator of reflecting and electrical addressing type, e.g. liquid crystal panel, each of which portions is corresponding to each of the reference pattern display portions. The incoherent to coherent converter is irradiated by optical modulating input from the opposite side to that for the beam 12. This modulating input beam will form an image of the pattern 18 "s" to be identified on the surface of the converter 16', through a focusing lens 17.

The signals for the reference pattern display portions are given from the group of the reference patterns and a feed-back information based on the corresponding correlation detected by the two dimensional image sensor 61 to the reference patterns, i.e. the duplication of the respective reference pattern with the information of the light intensity to emit from each of the reference patterns formed on the plane of the pattern display apparatus 16'. In the other words, the pattern display apparatus 16' in the optical apparatus for obtaining each of the correlations has functions of both of the valve 15 and the pattern display apparatus 16 in the apparatus for obtaining the correlation of FIG. 2.

The patterns (data) formed on the plane of the display 16' radiates and passes through a Fourier-transforming lens 21 thereby forming focus on the plane of the display 45' forming the Fourier-transformed patterns. Further, the pattern "s" 18 images onto the valve 16b and the CCD 92 through an imaging lens 17, and then the imaged pattern is displayed on the plane 93, and irradiated and passes through a Fourier lens 95 and detected by the apparatus 96. The resulting pattern is fed into the plane 83.

EXAMPLE 5

Figure 7:
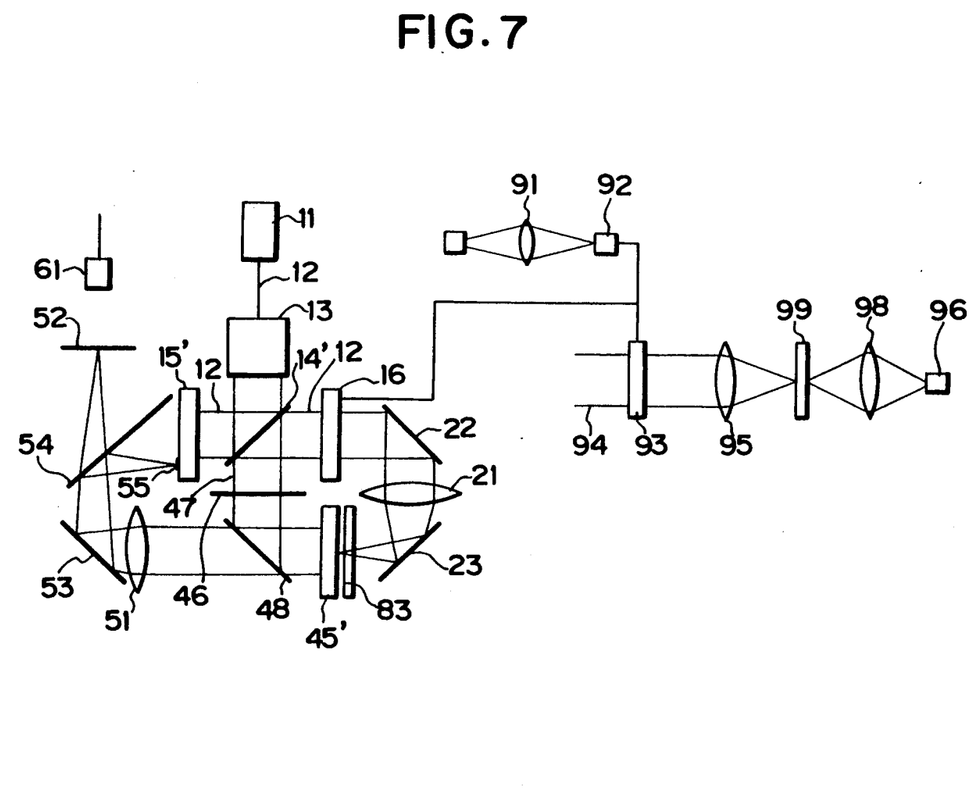

FIG. 7 shows another optical apparatus of identifying a pattern to be identified by obtaining the correlation between the pattern to be identified and each of the reference patterns. In this apparatus, an optical feed-back system is used as shown in FIG. 7 wherein the input patterns of the valve 96 is fed into the display 83.

Polarized beam splitters 14' and 48', and optical addressing type liquid crystal light valves 45' and 15' are used to constitute a closed circuit loop of the optical system, in which the optical addressing type liquid crystal light valve 15' may act all of functions of the liquid crystal panel 15 and CCD 61 and processing and driving circuit 62 as used in Example 3 as shown in FIG. 5.

The reference patterns formed on the pattern display apparatus 16, which beam is reflected by the mirror 23 and forms Fourier lens 21, and is reflected by the mirror 23 and forms Fourier transformation of complex amplitude pattern on the plane of the liquid crystal light valve 45'. The liquid crystal light valve 45' is substantially the same as the liquid crystal light valve 15' which has fractioned portions corresponding to each of the reference patterns on the display apparatus 16, and the beam 12 is a read-out beam, and the size of the fractioned portions in the valve 45' will be reduced depending on the size of the patterns of the interference fringe incident.

Those optical addressing type liquid crystal valve 15' and 45' do not have any polarization plate, and such polarization would be done by the polarization beam splitter 14' and 48'. The beam 12 is reflected by the polarization beam splitter 14' only in its "s" polarized component, and fed into the valve 15'. At the same time, the correlation outputs in accordance with the each of the fed reference patterns are presented on the plane of the valve 15'. Then, the beam which enters at the location having high correlation output will be rotated by the polarization plane and is reflected and passes through the beam splitter 14' resulting the higher intensity. Therefore, the beam reflected at the position having higher correlation will have higher intensity, and the beam reflecting at the position having the lower correlation will be lower.

The power spectrum pattern of the patterns on the display apparatus 16 is fed into the write-in plane of the valve 45', and the beam 47 of "p" polarized light passing through a polarizing beam splitter 14' passes through a half wavelength plate 46 and then is rotated in its polarization direction so as to produce the beam with "s" polarized component. The beam is reflected by a polarized light splitter mirror 48 and incident upon the read-out plane of the liquid crystal light addressing valve 45'. Then, the intensity distribution (the pattern of the power spectrum) incidences upon the write-out plane of the valve 45' so as to produce the distribution of the polarization degree in the read-out plane 45', and the distribution of intensity resulted from the polarization distribution formed in the plane radiates and passes through the beam splitter 48 and a Fourier transforming lens 51 and is focused on the write-in plane of the light addressable valve 15'. The distribution pattern corresponding to the power spectrum of the patterns formed on the write-in plane of the valve 15' is presented on the read-out plane of light addressing liquid crystal light valve 15'.

The output beam with this distribution pattern is split into two beams by a beam splitter 54, one of which is fed into the screen 52, where the formed pattern on the screen 52 is detected by the CCD 61.

The input pattern into the light valve 15' can modulate the light intensity to irradiate the display 16 as mentioned previosuly.

The incident beam 47 incidenting upon the read-out plane of the light valve 45' is modulated in the light valve 45' in a similar way to that of the beam 12 in the light valve 15', and the intensity pattern formed corresponding to the the Fourier transformation of the complex amplitude distribution on the display 16 by the beam incidenting upon the write-in plane of the light valve 45' and reflected thereby so as to pass through the beam splitter 48, and through a Fourier transformation lens 51 and reflected by a mirror 53 and passes through the half-mirror 54, and will form the focus on the screen 52 and make a power spectrum pattern of the complex amplitude distribution of of the beam 97 on the light valve 45', and the formed pattern on the screen 52 is detected by a CCD camera 61. The incident beam 47 entering into the valve 15' is provided that the optical axis thereof i.e. the 0 order peak thereof is positioned at the position 55 in the pattern to be identified formed on the read-out plane of the valve 15'. The positions of each of the reference patterns and the optical arrangement are previously designed so that the respective corresponding correlation peaks are located at the positions of each of the reference pattern formed on the valve 15'.

Accordingly, the reference pattern having the stronger cross-correlation to the pattern to be identified is irradiated by the beam of the stronger intensity, while the reference pattern having the weaker correlation to the pattern to be identified is irradiated by the weaker beam. The cross-correlation can be observed or determined by detecting the radiation intensity distribution of the pattern formed on the screen 52 with a two dimensional image sensor 61 such as a charge coupled device(CCD).

The element to function as a spatial light modulator in the inventive apparatus for obtaining the correlation can be an electric adressing type and an optical adressing type. Examples of the electric adressing type may be a liquid crystal panel as used in the above Examples, and a ceramic element and crystal having a photoelectric effect, such as PLZT, KDP and BSO ($Bi_{12}SiO_{20}$) provided with matrix electrodes.

Examples of the optical addressable type modulator may have the structure including the similar ceramic material combined with a photoconductive layer. Such spatial modulator may be of transparent type or of reflecting type.

The material having a photorefractive effect, such as BSO and $BaTiO_3$ can change the refractive index induced by the electric field of photo-induced electron charge of the material depending on the intensity of the incident beam, and then, there is no need of providing a photoconductive layer. However, when the read-out beam will erase wholly the information formed in the element of optical addressing type by the addressing beam, the wavelength range of the read-out beam should be separated from that of the addressing beam in order to avoid the influence of the read-out beam to the recorded information.

When the element of the electric addressing type is used, the two dimensional image sensor and the driving circuit to drive the electric addressing type spatial light modulator are necessary to produce the input pattern, and therefore, there is provided an advantage of facilitating to process those signals therefor.

An ordinary incoherent to coherent converter belongs to the spatial light modulator of reflecting type using the optical addressing element, and then the ordinary converter can be used for a display portion 16b for the pattern to be identified, in the display apparatus 16, and further, the optical system to produce the pattern for irradiating the input pattern on the incoherent to coherent converter to translate incoherent patterns into coherent patterns is necessary. In this case, a reference pattern display portion 16a can be easily constructed in optical form of reflecting type.

When the spatial light modulator is used for reference pattern display portions, each of the reference patterns can be formed in nearly real time operation, and then, a number of reference patterns and the pattern to be identified can be formed at the first stage in the same plane in form of outlined pictures or in low resolution, and the processing is carried out with a number of the reference patterns, and the size of the displayed pattern is increased with increasing the resolution thereof, and lastly, each of the correlations can be obtained with high accuracy, which can establish the smooth and sure identification.

Therefore, the spatial light modulator can be any combination of the above mentioned elements, and then, the inventive apparatus for obtaining the correlation can be composed in any combinations, and in various embodiments.

The apparatus for identifying the pattern in accordance with the present invention does not need any holographic means for processing the corresponding each of the correlations between each of the reference patterns and the pattern to be identified in real-time operation time. Further, the number of the reference patterns to be compared with the pattern to be identified can be drastically raised by the inventive apparatus for obtaining the correlation.

While the present invention has been described with reference to the particular illustrative embodiments, it is not to be restricted by those embodiments but only the appended claims. It is to be appreciated that those skilled in the art can change or modify the embodiments without departing from the scope and spirit of the present invention.

We claim:

1. An optical method for identifying or recognizing a pattern to be identified which comprises the steps of
   (a) irradiating coherent radiation on a pattern to be identified and each of reference patterns to be compared with, so as to display on a first optical display plane simultaneously coherent patterns having first complex amplitude distribution, consisting at least of a pattern to be identified, and each of a plurality of reference patterns;
   (b) Fourier-transforming optically said first complex amplitude distribution, so as to produce a first power spectrum corresponding to the light intensity distribution of its Fourier transformation patterns of said first complex amplitude distribution;
   (c) irradiating coherent radiation again to the pattern based on said first power spectrum so as to produce a second complex amplitude distribution corresponding to said first power spectrum;
   (d) Fourier-transforming optically said second complex amplitude distribution to produce a second power spectrum which is the light intensity distribution of a Fourier-transformation pattern corresponding to an output of correlation formed between the pattern to be identified and each of said reference patterns;
   wherein the area of said second complex amplitude distribution for said Fourier transformation to produce the second power spectrum is restricted in accordance with a two dimensional Fourier-transformation pattern of the pattern to be identified, by controlling the transmittance or the reflectance of each of the portions of said display plane;
   and wherein only the pattern to be identified is irradiated by a coherent radiation, and then, a complex amplitude distribution only due to the pattern to be identified is optically Fourier-transformed in a spatial frequency coordinates which have almost the same scale as the coordinates of the first power spectrum, so as to produce a third power spectrum; and the resulting third power spectrum and said first power spectrum are superimposed, and the range in the first power spectrum contributing to the light intensity distribution of the second spectrum is restricted to the area having the light intensity of the third spectrum over the certain threshold value of the light intensity.

2. The optical method for identifying a pattern to be identified in accordance with claim 1,
   wherein each of said first complex amplitude distributions from each of reference patterns is modulated in accordance with each of light intensity of the second power spectrum corresponding to the correlation with the pattern to be identified.

3. The optical method for identifying a pattern to be identified in accordance with claim 2,
   wherein said third power spectrum is modulated by a first two-dimensional image sensor, and the resulting pattern is binarized and fed to a first spatial light modulator positioned in the optical plane of said first spectrum.

4. The optical method for identifying a pattern to be identified in accordance with claim 3,
   wherein said first power spectrum is fed into a second two-dimensional image sensor;
   said third power spectrum is fed into said first two-dimensional image sensor;
   said modulation of said reference patterns include binarizing the output from said first two-dimensional image sensor, so as to multiply the resulting pattern with the output pattern from said second two-dimensional image sensor so as to obtain the product of the patterns, and the product of said patterns being used as said first power spectrum is optically Fourier-transformed so as to produce said second power spectrum.

5. The optical method for identifying a pattern to be identified in accordance with claim 3,
   wherein said modulation of said reference patterns include feeding said third spectrum into a second light-addressing type spatial light modulator, and then, the output pattern from said second modulator is fed into said first two-dimensional image sensor, and the output pattern from said first two-dimensional image sensor is fed into said first spatial light modulator;
   said second light-addressing type spatial light modulator having a certain threshold value in regard to the intensity of the input light, whereas the transmittance or reflectance of the display plane to the read-out radiation within the corresponding areas having the input light intensity above said threshold value is higher, and the transmittance or reflectance of the plane within the other areas is lower.

6. The optical method for identifying a pattern to be identified in accordance with claim 5,
   wherein said first spectrum is fed into said second two-dimensional image sensor; and said modulation of said reference patterns include feeding said third power spectrum into said second light-addressing type spatial light modulator having a certain threshold value in regard to the input intensity, whereas the transmittance or reflectance of the read-out radiation within the corresponding areas having the input light intensity above said threshold value is higher, and the transmittance or reflectance within the other areas is lower; and feeding the output pattern from said second spatial light modulator into said first two-dimensional image sensor so as to product the output pattern, and the resulting pattern is multiplied in an electric processor by the output pattern from said second two-dimensional image sensor so as to obtain the product of the two patterns, and then, the product of said patterns being used as a first power spectrum is optically Fourier-transformed so as to produce the second power spectrum.

* * * * *